Oct. 10, 1961 E. W. PITT 3,003,793
LONGITUDINALLY DIVIDED SLEEVED PIPE COUPLING
Original Filed July 1, 1957
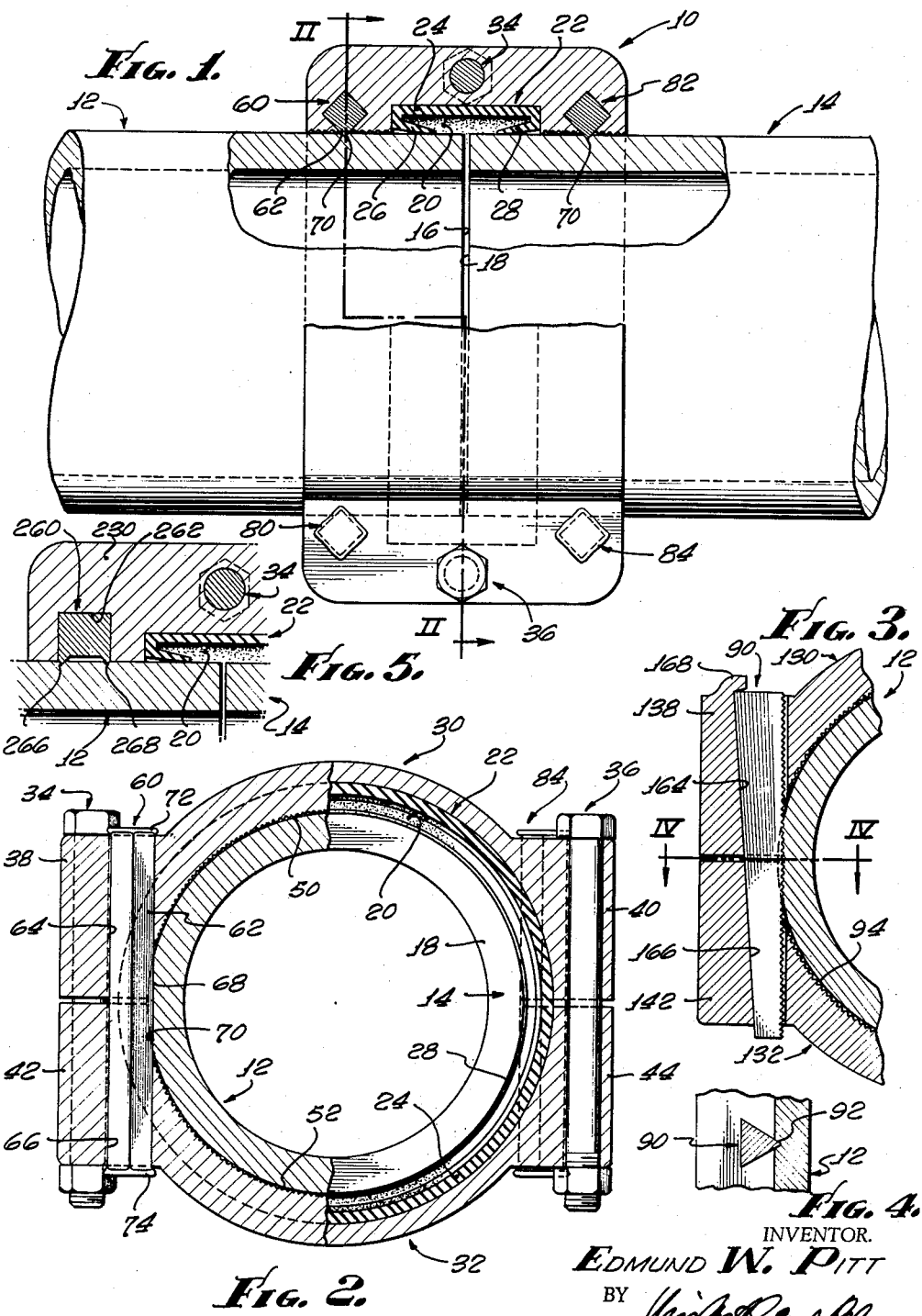
INVENTOR.
EDMUND W. PITT
BY
ATTORNEYS.

United States Patent Office 3,003,793
Patented Oct. 10, 1961

3,003,793
LONGITUDINALLY DIVIDED SLEEVED
PIPE COUPLING
Edmund W. Pitt, 91 N. Greenwood Ave.,
Pasadena, Calif.
Continuation of application Ser. No. 668,942, July 1, 1957. This application Apr. 14, 1960, Ser. No. 22,365
1 Claim. (Cl. 285—112)

This invention relates generally to a connecting device for coupling the ends of two pipes, and particularly to a coupling for locking together pipes made of a tough material such as steel or the like.

Many prior devices have been provided for coupling together the ends of two pipes, but prior devices have generally required that the ends of the pipes be specifically prepared in some way, typically by a machining operation such as cutting a groove peripherally of the pipe spaced slightly from the end, or providing threads or similar connecting formations in the pipe body. The grooves or threads thus formed are then gripped in a suitable manner by a coupling member which may be of one piece construction or formed in two semicircular shell elements which are retainable together by fastening means such as bolts or the like. Resilient gasket means are normally provided when the shell arrangement is used by which to insure that a hermetic seal is made between the two pipes being coupled.

According to my invention, the ends of pipes to be coupled need not be specifically prepared in any particular manner. Gasket means may be used to surround end portions of the two pipes being coupled, such gasket means normally taking the form of a sleeve or similar construction made of rubber or equivalent resilient material. In a preferred form of the invention a housing body comprising a pair of semi-cylindrical shells is provided, and each shell includes a pair of diametrically opposed holes which are designed to register with corresponding holes of the other shell when the device is in assembled condition, in a maner well known in the art. Fastening members such as bolts extend through the registering openings or holes in order to retain the two shell portions in assembled relation. Portions of the inner circumference of the shell members serve to back up and reinforce the gasket means being coupled, and inner cylindrical portions of the housing body are desirably provided with roughened or knurled surfaces by which to frictionally grip the outer wall portions of the pipes as will be later understood.

In addition, the housing body is provided with two or more openings extending therethrough, the openings being disposed transverse to the pipe axis and having an inner edge constituting a shallow chord across the circumference of the pipe, and being spaced away from the plane of juncture between the two pipes being coupled. These latter openings receive locking elements which may be driven into the openings after the pipes are assembled with the housing body encircling end portions of the pipes. The locking elements include an inwardly directed cutting edge and are desirably polygonal in section. The inwardly directed edge may be serrated, and is adapted to be forced into cutting contact with the outer wall of the pipe when the locking element is forced into the opening. The groove thus cut constitutes a shallow chord in the outer wall of the pipe, thereby locking the pipe to the housing body. Ends of the locking element may be peened over in order to retain the locking element in the body. Alternatively the locking element or its housing opening, or both, may be tapered throughout a substantial portion of their lengths. Whether tapered or not, the locking element may be knocked out of its opening for disassembly as by a drift pin. When end portions of the locking element are peened over, it is desirable to remove the peened over material as by drilling to facilitate disassembly.

Typically pipes coupled in accordance with the present invention may be concentric and of equal size, although it will be seen that the invention is adapted to coupling pipes meeting at an angle between their axes, and of unequal sizes.

Accordingly, it is a principal object of this invention to provide a novel coupling for joining pipes together not requiring any prior preparation of the end portions of the pipe.

Additional objects of the invention are to provide a pipe coupling which may be assembled and disassembled with a minimum number of tools; to disclose a coupling adapted to hold pipes joined thereby in rigid relationship once the coupling is assembled; and to provide a coupling of exceptional ease and economy of use in the field. Other advantages and purposes of the invention will become clear as the description of preferred embodiments thereof progresses.

The invention will be understood by reference to the accompanying drawings in which:

FIG. 1 is a side elevational view, with portions cut away, of a pair of pipes coupled by a preferred form of the device of the present invention.

FIG. 2 is a sectional view taken on the broken line II—II of FIG. 1.

FIG. 3 is a fragmentary view in section showing a modified form of locking element of the present invention.

FIG. 4 is a fragmentary sectional view taken on the line IV—IV of FIG. 3.

FIG. 5 is a fragmentary sectional view corresponding to a portion of FIG. 1 but showing a further modified form of locking element of the present invention.

Referring now in detail to the drawings there is shown in FIG. 1 a coupling indicated generally at 10 adapted to couple two pipes, end portions of which are indicated generally at 12 and 14 respectively. Pipe 12 terminates at end 16 while pipe 14 terminates at end 18, and in the present illustration these ends are shown as being slightly spaced, although they may be juxtaposed if desired when the pipes are concentric and of the same size. Desirably, the housing body 10 is provided with an internal annular chamber 20 in which is housed a gasket of resilient material and annular in shape indicated generally at 22. The gasket includes a generally flat base 24 and inturned lips 26 and 28 tapering inwardly from the outer ends of the base 24, the lips being adapted to contact the outer surfaces of the respective pipes 12 and 14 around their peripheries.

The housing body 10 may be in the form of a one-piece collar having an opening extending therethrough terminating in bores for encircling end portions of the pipes to be coupled. In the present embodiment of the invention, however, the housing body 10 is made up of a pair of semi-cylindrical shell elements indicated generally at 30 and 32 which are retained in assembled relation as seen in FIG. 2 by clamping members such as bolts indicated generally at 34 and 36 extending through registering openings formed in enlarged bosses 38 and 40 of shell member 30 and bosses 42 and 44 of shell member 32. The inner, semi-cylindrical surfaces of the shell members 30 and 32 form pipe-receiving bores and may be roughened as indicated at 50 and 52 respectively in order to more securely grip end portions of pipes to be coupled when the device is assembled as seen in FIG. 2.

Means are provided for positively locking the end portions of the pipes in the housing body 10. Such means include elongated rigid locking elements carried in openings formed in the bosses of the semi-cylindrical shell members, the locking elements being provided with inwardly directed relatively sharp edges by which to cut shallow grooves in the outer periphery of the pipes being secured by the present coupling. One such locking element is indicated generally at 60 and may be of polygonal shape, preferably rectangular, including an inwardly directed edge 62. The locking element is slidably received in a pair of registering openings 64 and 66 formed in shell members 30 and 32 respectively, the openings extending generally transverse to the axis of the pipe 12 and the inner extent of the opening constituting a shallow chord 68 relative to the outer circular periphery of the pipe 12. The locking element 60 is of substantially the same size as the openings 64 and 66 in which the locking element is slidably received, with the result that when such locking element is inserted in the openings into the position seen in FIG. 2, the inner edge 62 of the locking element is caused to cut a shallow groove 70 forming a chord in the outer surface of the pipe. The locking element 60 may be retained in position as seen in FIG. 2 by any suitable means. In the illustrative embodiment of FIG. 2, such retention of the locking element 60 is achieved by providing enlarged portions 72 and 74 at opposed ends of the locking elements 60, such enlarged portions being formed as by peening or the like.

Desirably, the locking elements such as 60 just described are provided in opposed diametrical relation, so that a second locking element indicated generally at 80 grips by cutting a shallow chord in the opposite side of the pipe 12 and locking elements indicated generally at 82 and 84 (see FIG. 1) similarly grip pipe 14 by making shallow cuts along diametrically opposed chords of the latter pipe.

FIGS. 3 and 4 show a modified form of locking element indicated generally at 90 of triangular section, the inwardly directed edge 92 being one apex of the triangle. A further modification is also illustrated here in that the inner edge 92 may be provided with serrations or similar configurations 94 to facilitate the cutting of the shallow chord in the pipe. Moreover, the locking element may be tapered throughout at least a substantial portion of its length, and openings 164 and 166 in bosses 138 and 142 may also be tapered conformably if desired. The tapered characteristic of the locking element in any of its forms tends to further facilitate the chord-cutting action of the element 90 as it is forced into its locking position as shown.

Deformable means may be provided on the body of the shell housing by which to retain the locking element in locked position. This may be particularly desirable when the housing is made of a tough malleable metal and the locking element itself is made of a very hard metal alloy which resists deformation such as the peening heretofore illustrated at 72 and 74. The housing boss 138 may thus be provided with an upstanding integrally formed lip 168 which may be forcibly bent over to overlie the locking element and retain it from movement. In the case of a non-tapered element such lips may be provided on the housing bosses at both ends of the locking element.

A further modification of a locking element in accordance with the present invention is shown in the fragmentary view of FIG. 5. Here the locking element indicated generally at 260 is slidably housed in an opening 262 formed in the housing body member 230. The locking element 260 is of generally rectangular cross section, except that its inner face is provided with a pair of laterally spaced inwardly projecting sharp cutting edges 266 and 268 adapted to cut shallow grooves forming chords in the outer surfaces of the pipe 12 when assembled, as is characteristic in the case of the other forms of the invention. This latter form of the invention is particularly desirable where added strength of the coupled joint is desired.

In all forms of the present invention the locking element is elongated and presents at least one inwardly directed cutting edge toward the outer periphery of the pipe to be coupled. The locking element is in all cases made of a suitably rigid and strong material such as tool steel or the like. It is to be noted that, although the illustrative embodiments of the invention hereinabove shown and described have disclosed the arrangement of locking elements disposed in diametrically opposed pairs, nevertheless this may not be necessary in all applications of the invention. It is necessary only that the longitudinally extending locking element be arranged in the opening or openings formed in the housing body so that the cutting edge of the locking element intersects and cuts the outer portion of the pipe along a chord generally transverse to the axis of the pipe and spaced from the end of the pipe. It is to be noted also that, although the present illustration shows pipes which are concentric and of identical size being coupled, the invention is equally adapted for use in coupling pipes of unequal size or pipes intersecting at an angle rather than on a common axis. In these latter cases, it is only necessary that the housing body be provided with properly oriented bores of suitable size to accommodate end portions of the pipes to be coupled, together with conforming design of the gasket member, when used.

The coupling is advantageous by reason of its ease and simplicity of use with a minimum of tools. Furthermore use of the present coupling eliminates the expense of forming annular circumferential grooves around the outer walls of pipes to be coupled, and also virtually eliminates the substantial weakening of the strength of the pipe resulting from such annular grooves as required in certain prior coupling devices. Also it will be noted that the present coupling may be advantageously used whether or not the end portions of the pipe are threaded.

This application is a continuation of my copending application Serial No. 668,942, filed July 1, 1957, and now abandoned.

Modifications and changes from the specific forms of the invention hereinabove shown and described as illustrative will occur to those skilled in the art and all such modifications and changes not departing from the spirit of the invention are intended to be embraced within the scope of the appended claim.

I claim:

In a pipe coupling, in combination: a pair of mating body members having semi-cylindrical concave surfaces adapted to encircle end portions of pipes to be coupled along a plane of juncture and having enlarged bosses; registering pairs of openings formed in said body members on opposite sides of said plane and on opposite sides of said semi-cylindrical concave surfaces, said pairs of openings having substantially parallel axes which are transverse to the axis of one of said pipes and having inner edges constituting shallow chords in the outer walls of the pipes to be coupled; means clamping said body members together with said surfaces in pipe gripping relation including elongated members extending through registering pairs of holes formed in said body members, said holes being substantially parallel to said openings and located in said bosses between said openings with their inner edges outwardly of the outer edges of said openings, whereby said holes and openings are accessible from one side when said coupling is used in a deep, narrow trench or the like, and said coupling has great strength irrespective of the type of stress imparted to it; a rigid elongated locking element drivingly received in each registering pair of openings and provided with an inwardly directed pipe-engaging edge cutting a shallow chord in the outer wall of the pipe to be coupled, whereby said locking elements maintain said pipe end portions securely and rigidly in fixed relation without requiring prior preparation of said pipe end portions, and said locking elements cooperate with said elongated members in maintaining said body members in aligned, clamped together relation; and gasket means housed in said pair of mating body members surrounding said pipe end portions.

References Cited in the file of this patent
UNITED STATES PATENTS

| | | |
|---|---|---|
| 1,232,447 | Horne | July 3, 1917 |
| 1,905,324 | Waters | Apr. 25, 1933 |
| 2,127,284 | Board | Aug. 16, 1938 |

FOREIGN PATENTS

| | | |
|---|---|---|
| 631,745 | Great Britain | Nov. 9, 1949 |